United States Patent
Popp et al.

(10) Patent No.: US 7,936,954 B2
(45) Date of Patent: May 3, 2011

(54) OPTICAL ROTARY JOINT WITH HIGH RETURN LOSS

(75) Inventors: Gregor Popp, Fuerstenfeldbruck (DE); Josef Braeu, Munich (DE); Matthias Rank, Wilmering (DE)

(73) Assignee: Schleifring und Apparatebau GmbH, Fuerstenfeldbruck (DE)

( * ) Notice: Subject to any disclaimer, the term of this patent is extended or adjusted under 35 U.S.C. 154(b) by 11 days.

(21) Appl. No.: 12/488,688

(22) Filed: Jun. 22, 2009

(65) Prior Publication Data

US 2009/0304330 A1 Dec. 10, 2009

Related U.S. Application Data

(63) Continuation of application No. PCT/EP2007/011373, filed on Dec. 21, 2007.

(30) Foreign Application Priority Data

Dec. 22, 2006 (DE) .......................... 10 2006 062 335

(51) Int. Cl.
- *G02B 6/26* (2006.01)
- *G02B 27/30* (2006.01)
- *G02B 27/00* (2006.01)

(52) U.S. Cl. .............. 385/25; 385/33; 385/36; 359/641; 359/580

(58) Field of Classification Search .................... 385/24, 385/25, 26, 27, 33, 34, 36, 15; 359/641, 359/580

See application file for complete search history.

(56) References Cited

U.S. PATENT DOCUMENTS

| | | | | |
|---|---|---|---|---|
| 4,303,300 | A * | 12/1981 | Pressiat et al. ................... | 385/26 |
| 5,039,193 | A * | 8/1991 | Snow et al. ...................... | 385/25 |
| 6,301,405 | B1 | 10/2001 | Keil ................................. | 385/25 |
| 7,268,946 | B2 * | 9/2007 | Wang .............................. | 359/569 |
| 7,373,041 | B2 * | 5/2008 | Popp .............................. | 385/26 |
| 2005/0036735 | A1 | 2/2005 | Oosterhuis et al. ............. | 385/26 |
| 2006/0024018 | A1* | 2/2006 | Piehl et al. ..................... | 385/147 |
| 2007/0053632 | A1* | 3/2007 | Popp .............................. | 385/26 |
| 2009/0304330 | A1* | 12/2009 | Popp et al. ..................... | 385/25 |

FOREIGN PATENT DOCUMENTS

EP 1416304 5/2004

OTHER PUBLICATIONS

Dos Santos et al., "Antireflection structures with use of multilevel subwavelength zero-order gratings," Applied Optics, vol. 36, No. 34, Dec. 1997, pp. 8935-8938.

International Search Report, PCT/EP2007/011373, mailed Apr. 29, 2008.

* cited by examiner

*Primary Examiner* — Brian M Healy
(74) *Attorney, Agent, or Firm* — Kevin L. Daffer; Daffer McDaniel, LLP

(57) ABSTRACT

An optical rotary joint comprises a first collimator arrangement for coupling-on first light-waveguides and a second collimator arrangement for coupling-on second light-waveguides, with the second collimator arrangement being supported to be rotatable relative to the first collimator arrangement about a rotation axis. A Dove prism is provided between the collimator arrangements as a derotating element. An intermediate layer is provided on at least one boundary face of an optical constituent part to a surrounding medium, which the intermediate layer comprises a nano-structure having a mean refractive index lying between a refractive index of a material of the optical constituent part and a refractive index of the medium of the surroundings.

15 Claims, 3 Drawing Sheets

Dependence of Reflectance upon the Number of Layers Comprising a Multi-Layered Intermediate Layer which is Interposed between Media having a Refractive Index Transition from 1.45 to 1.65

OPTICAL ROTARY JOINT WITH HIGH RETURN LOSS

CONTINUING DATA

The present application is a continuation of pending International Patent Application No. PCT/EP2007/011373 filed Dec. 21, 2007, which designates the United States and claims priority to German Patent Application No. DE 102006062335.5 filed Dec. 22, 2006, now abandoned.

BACKGROUND OF THE INVENTION

1. Field of the Invention

The invention relates to an optical rotary joint, and also to a micro-optical system such as a collimator for optical beam guiding or beam shaping.

2. Description of the Related Art

Various transmission systems are known for transmitting optical signals between units that are rotatable relative to each other.

An optical rotary joint for a plurality of channels, having a Dove prism as a derotating element is disclosed in U.S. Patent Application Publication No. 2005/0036735. Light from supply light-waveguides is coupled via collimators into a Dove prism, derotated by means of the latter, and fed into leading-away light-waveguides via further collimators. In order to render the arrangement independent from the refractive index of a medium in the surroundings of the Dove prism, the prism is provided with supplementary optical members which ensure perpendicular light entry. Owing to this perpendicular light entry, no refraction occurs at the transition face. A disadvantage of this is the partial reflection of light at the perpendicular transition face, so that at least a portion of the light is coupled back into the light-waveguide. This results in a relatively small return loss.

Another kind of optical rotary joint is disclosed in International Publication No. WO 01/98801. This describes a micro-optical system having optical and mechanical components as a one-piece constituent part. With this design a substantially higher packing density of the individual glass fibers can be attained. Once again, the parallel light-entry and light exit faces are of disadvantage, as they cause a relatively small return loss.

It is a disadvantage of the known prior art that relatively strong reflections of the transmitted light arise inside the rotary joint or at the collimators. An improvement can be achieved with vapor-coated intermediate layers, the refractive indices of which lie between the refractive index of the optical components and that of the surroundings. However, with different surrounding media such as air or oil it is also necessary to adapt the intermediate layers.

BRIEF SUMMARY OF THE INVENTION

Optical rotary joints and micro-optical systems, such as collimators, used for multi-channel transmission of optical signals are provided, particularly having designs so that the optical return loss of the arrangements is improved relative to conventional systems and further such that the systems are suitable for use with different surrounding media. The following are mere exemplary embodiments of the optical rotary joints and micro-optical systems and are not to be construed in any way to limit the subject matter of the claims.

An embodiment of an optical rotary joint includes as optical constituent parts: a first collimator arrangement for coupling-on first light-waveguides, a second collimator arrangement for coupling-on second light-waveguides, and a derotating optical element which is located in a light path between the first collimator arrangement and the second collimator arrangement. The second collimator arrangement is supported to be rotatable relative to the first collimator arrangement about a rotation axis. An inner space of the optical rotary joint between the optical constituent parts is filled with a medium. At least one of the optical constituent parts has an intermediate layer on a boundary to the medium and the intermediate layer has a refractive index in a range between a refractive index of an optical material of the at least one optical constituent part which is distinct from the intermediate layer and a refractive index of the medium.

An embodiment of a collimator for at least one of optical beam guiding and beam shaping includes an intermediate layer constituting at least one of its boundary faces. The intermediate layer has a refractive index in a range between a refractive index of an optical material of the collimator which is distinct from the intermediate layer and a refractive index of the medium surrounding the collimator.

A micro-optical system, includes an intermediate layer constituting at least one of its boundary faces. The intermediate layer has a refractive index in a range between a refractive index of an optical material of the micro-optical system which is distinct from the intermediate layer and a refractive index of the medium surrounding the micro-optical system.

BRIEF DESCRIPTION OF THE DRAWINGS

In the following, the invention will be described by way of example, without limitation of the general inventive concept, on examples of embodiment and with reference to the drawings.

Figure 1:
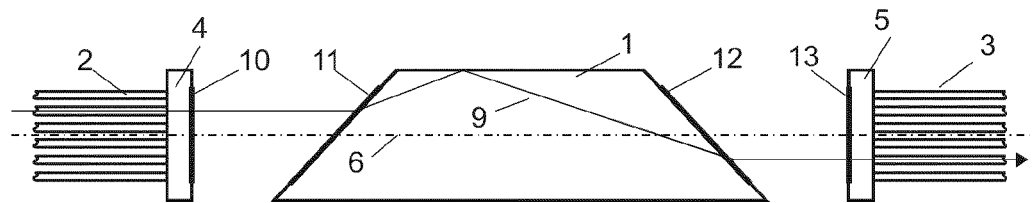
FIG. 1 schematically shows in a general form an arrangement an optical rotary joint.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF PREFERRED EMBODIMENTS

FIG. 1 shows in schematic form a cross-section of an arrangement of an optical rotary joint along the rotation axis 6. The optical rotary joint comprises a first collimator arrangement 4 for coupling-on light-waveguides 2, a second collimator arrangement 5 for coupling-on further light-waveguides 3, and a derotating optical element 1. The light entry/exit faces of the first collimator arrangement 4 comprise a first intermediate layer 10. The light entry/exit faces of the derotating optical element 1 comprise a second intermediate layer 11 and also a third intermediate layer 12. The light entry/exit face of the second collimator arrangement 5 comprises a fourth intermediate layer 13. An example of a ray path of a light ray 9 is illustrated as starting from first light-waveguides 2, passing through the first collimator arrangement 4, passing through the Dove prism 1, passing through the second collimator arrangement 5, and traveling as far as and into the second light-waveguides 3.

Figure 2:
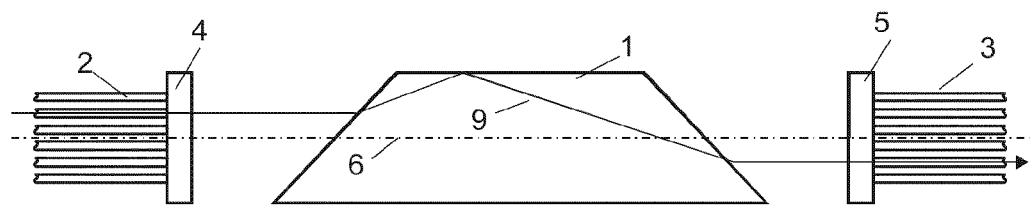
FIG. 2 shows an example of a conventional optical rotary joint.

FIG. 2 shows in a schematic form an arrangement of a conventional optical rotary joint. The optical rotary joint comprises a first collimator arrangement for coupling-on first light-waveguides 2 and a second collimator arrangement 5 for coupling-on second light-waveguides 3. The second collimator arrangement 5 is supported to be rotatable relative to the first collimator arrangement 4 about the rotation axis 6. A derotating element in the form of a Dove prism is located in the beam path between the first collimator arrangement 4 and the second collimator 5 to compensate the rotary movement. An example of a ray path of a light ray 9 is illustrated as starting from first light-waveguides 2, passing through the first collimator arrangement 4, passing through the Dove prism 1, passing through the second collimator arrangement 5, and traveling as far as and into the second light-waveguides 3.

Figure 3:
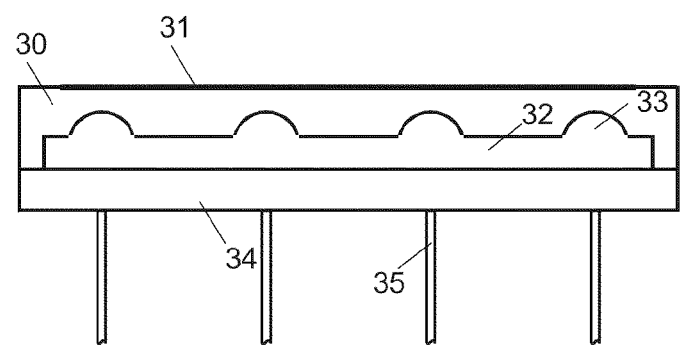
FIG. 3 shows an embodiment of a micro-optical system.

FIG. 3 shows in schematic form a sectional view of an example of an optical constituent part for a micro-optical system. It comprises a support plate 34 for coupling-on light-waveguides 35. A material 32 having a second refractive index is located on the other side of the support plate 34. Above this is disposed a material 30 having a first refractive index. Lenses 33 for focusing are formed between the two materials. An intermediate layer 31 is disposed on the light entry/exit face, i.e. in this case on the upper side of the material 30 having the first refractive index.

Figure 4:
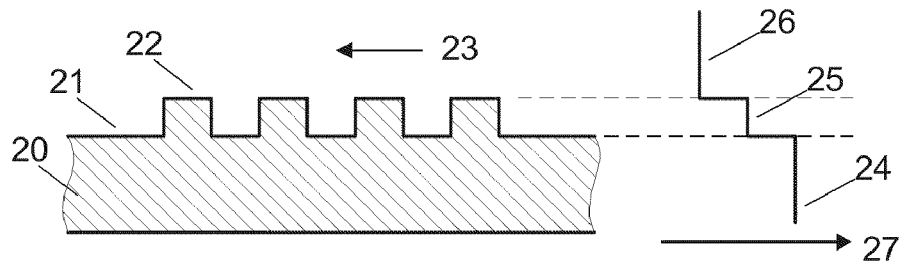
FIG. 4 shows in detail an exemplary embodiment of an intermediate layer which may comprise the systems depicted in FIGS. 1 and 3.

FIG. 4 shows a cutout portion of the surface of an optical constituent part 20. The corresponding refractive index is graphically represented on the right-hand side thereof. Recesses 21 and raised portions 22 are provided on the transition face to the medium 23 to form the intermediate layer. In some embodiments, the recessed portions may comprise approximately 50% of a surface of the intermediate layer. The medium penetrates into the recesses 21. This results in a mean refractive index 25 lying between the refractive index 24 of the optical constituent part 20 and the refractive index 25 of the medium 23. The arrow 27 points in the direction of increasing refractive index. In an advantageous manner, the raised portions can be designed to be also of pyramidal shape or conical shape, so that a continuous transition of refractive index results.

Figure 5:
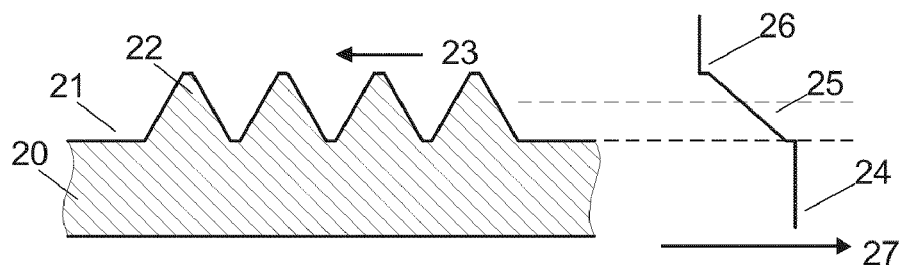
FIG. 5 shows a different exemplary embodiment of an intermediate layer having cone-shaped apices which may comprise the systems depicted in FIGS. 1 and 3.

FIG. 5 shows an arrangement similar to that of FIG. 4, however with conically shaped apices on the surface. This results in an almost linear transition of the refractive index.

Figure 6:
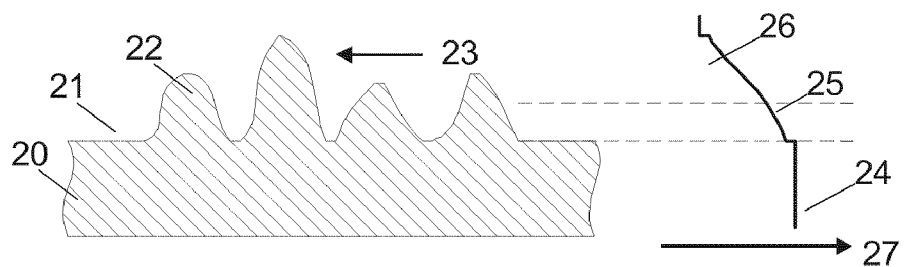
FIG. 6 shows a different exemplary embodiment of an intermediate layer having an irregular surface which may comprise the systems depicted in FIGS. 1 and 3.

FIG. 6 shows an arrangement similar to that of FIG. 4, however with an irregularly distributed surface. This results in a continuous transition of the refractive index.

Figure 7:
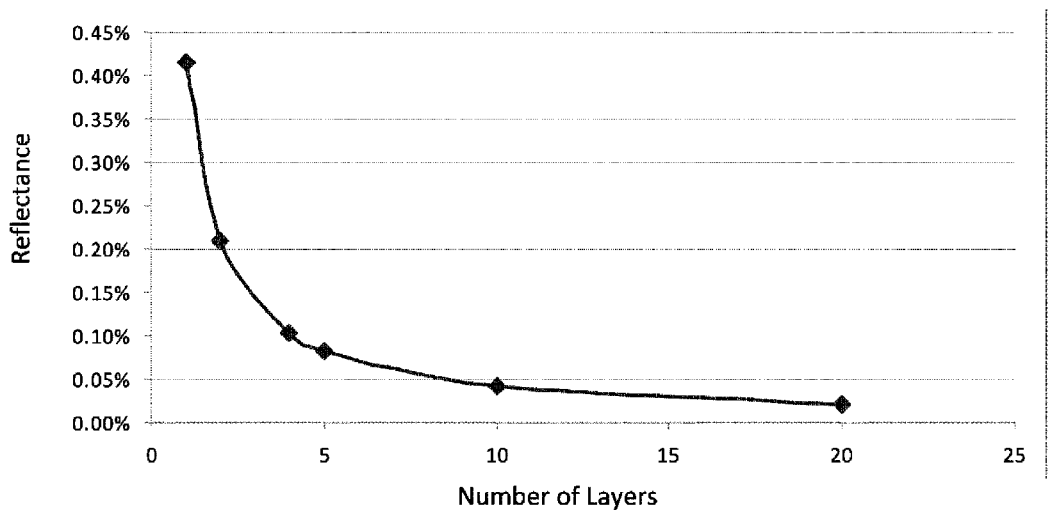
FIG. 7 shows the variance of reflectance among multi-layer intermediate layers in dependence upon the number of layers comprising the intermediate layers.

FIG. 7 shows the reflectance (vertical axis) in dependence upon the number of layers (horizontal axis) of a multi-layered structure of the intermediate layer on an example of a refractive index transition from 1.45 to 1.65. It can be distinctly seen that a lower reflectance can be achieved with a larger number of layers.

The rotary joint described herein has two collimator arrangements 4, 5 which are disposed to be rotated relative to each other about a rotation axis 6. An optical path for transmission of light exists between the first collimator arrangement 4 and the second collimator arrangement 5 which is disposed to be rotatable relative thereto. In this optical path, at least one derotating optical element is present, for example a Dove prism 1, which ensures an imaging of the light emitted by the first collimator arrangement 4 onto the second collimator arrangement 5, and also in the opposite direction, independently from the rotational movement between the two collimators. For this, the Dove prism is rotated at one-half of the angular speed of the rotation of the first collimator arrangement 4 and the second collimator arrangement 5. The inner space of the rotary joint arrangement is filled with a medium, for example a gas or an oil.

Each of the collimator arrangements 4, 5 comprises at least one collimator, and also at least one means for holding the at least one collimator. Here, the term collimator is used in its broadest sense to denote a beam-guiding or beam-shaping element. The purpose of a collimator of this kind consists of converting the light guided in a light-waveguide, for example a single-mode fiber or also a multi-mode fiber, to a beam path which can be passed through the rotary joint and, in particular, through the derotating element. This corresponds to a beam path in free space or in an optical medium such as, for example, glass or oil. Similarly, a conversion in the opposite direction can be effected, i.e. from a beam path in the rotary joint to a light-waveguide. Conversions in both directions in a collimator are also conceivable, so that bidirectional signals can be transmitted. Typically, the collimators are lenses, gradient-index lenses (GRIN lenses) being particularly preferred. Similarly, a collimator can be designed also as a micro-optical system. The collimator arrangements 4, 5 and also the derotating optical element 1 are here each designated also by a summary term as being optical constituent parts.

At least one of the collimator arrangements 4, 5 and/or the prism has at least one intermediate layer on an optical light-entry face and/or light-exit face. The intermediate layer preferably comprises a nano-structure. The term nano-structure, as used herein, relates to a structure in which its elements and also the distances of the elements from each other are of an order of magnitude that is smaller than or equal to the light-wavelength to be transmitted. Furthermore, the intermediate layer has a refractive index gradient lying in a range between the refractive index of the material and the refractive index of the medium of the surroundings. Alternatively, the intermediate layer has a mean refractive index that lies between the refractive index of the material and the refractive index of the medium of the surroundings. The term material refers to the optical material of the optical constituent part which is distinct from the intermediate layer. The refractive index of the material is intended to refer to the refractive index in the region of the entry/exit surface, but still outside the intermediate layer. If, for example, the refractive index of the material has a value of 1.65, and the refractive index of the medium of the surroundings has a value of 1.45, then the refractive index gradient could extend from 1.65 to 1.45. The mean refractive index of the intermediate layer in such an embodiment is preferably at a value of approximately 1.55.

Owing to the inclusion of intermediate layer/s within the systems and devices described herein, a transition between the material of the optical constituent part and the medium of the surroundings occurs with a reduced discontinuity of refractive index. Thereby, the reflections are reduced. Because of the nano-structure of the intermediate layer, a mixing of both media occurs, so that a mean refractive index results. If the nano-structure comprises a multitude of cones or pyramids, then the large base surfaces lead to a relatively high refractive index in their locality, and the small diameters of the apices lead to a low refractive index in their locality. This applies in the case that the refractive index of the intermediate layer is higher than the refractive index of the medium. The same principle can be applied correspondingly in the opposite case. Similarly, an intermediate layer with a porous structure having hollow spaces increasing towards a surface of the intermediate layer can be used. Owing to embodiments of the intermediate layer having a nano-structure, the benefits realized by inclusion of the intermediate layer are independent of the refractive index of the surroundings. As the medium of the surroundings can penetrate or diffuse into the nano-structure, a mean refractive index will always result. Thus, the systems and devices described herein can be operated with different surrounding media without modification. Thus, the inside of a rotary joint can be filled with a liquid such as, for example, water or oil. Similarly, it can contain a gas.

For a dimensioning of the nano-structure of the intermediate layer, it is of importance that signal spreading perpendicularly to the layer be not substantially affected. Thus, the structure should have an extent of less than one wavelength in order that diffraction effects be avoided. The term nano-structure relates to a structure in which its elements, and also the distances of the elements from each other, are of an order of magnitude that is smaller than or equal to the light-wavelength to be transmitted. On the other hand, the thickness of the nano-structure or the material of the intermediate layer should be greater and preferably distinctly greater than the wavelength of the light to be transmitted. Interference layers within conventional optical systems which are also used for reducing the reflections typically have layer thicknesses of a magnitude of one-quarter of a wavelength. The effect of these layers is wavelength-dependent.

It is of particular advantage to design the intermediate layer thickness to be >2, or even better >5, or substantially better >10 light wavelengths than the wavelength of the light to be transmitted through the intermediate layer. At large intermediate layer thicknesses, interference effects become background effects. Here, the substantial effect is achieved by an adaptation of the refractive index. With very large intermediate layer thicknesses, transit time distortions of the transmitted signal can occur. Thus, the transit time difference can be estimated via the maximum difference of the refractive indices. If, for example, a maximum jitter of 20 ps is admissible for a path of 10 Gb/s, then the maximum layer thickness $D=20\text{ ps} \times c_0/(n1-n2)$, where $c_0$ is the velocity of light in vacuum, and n1 is the refractive index of the material, and n2 is the refractive index of the medium. With the systems and devices described herein, return losses of more than 55 dB corresponding to 0.0003% can be achieved. With conventional interference layers, boundary face reflections of only 1.5% can be achieved.

An intermediate layer described herein can be designed so that it can accommodate the medium of its surroundings at least partly, and thus can conform to the properties of the medium. Thereby, an automatic conformation to the respective surrounding medium occurs. Contrary to this, previously known systems are designed for a fixed given surrounding medium. In addition, a medium can be firmly introduced into the structure of an intermediate layer described herein.

Furthermore, an intermediate layer described herein may be built up of a plurality of partial layers having different refractive indices.

An intermediate layer described herein may be produced, for example, with one of the following methods:
(a) Plasma etching;
(b) Mechanical grinding operations such as sand blasting or grinding with fixed or free grain (abrasive paste, emulsion);
(c) Roughing the substrate or an applied layer;
(d) Etching with fluid-bonded etching media such as hydrofluoric acid—for which the medium can be also inhomogeneous and can comprise, for example, a mixture of an etching medium and a non-aggressive carrier material. For this, the etching operation can be performed with or without a mask. As a mask, an exposed photoresist of defined structure or a medium applied in defined manner (spray, condensation) can be used; or
(e) Coating with a layer by a 2-phase system in which one phase is volatile and can be exchanged for the medium to be used in the intended application.

The optical rotary joint described herein is basically practicable with all derotating optical elements. For the sake of illustration, reference is here made to a Dove prism. Similarly, however, an Abbe-König prism can be used as a derotating element. Of particular advantage is the use of a prism having supplementary elements, as is disclosed for example in German Patent Application No. DE 10 2005 041547 B3, so that the outer light-entry faces are perpendicular to the light beam path.

As described above, the optical rotary joints described herein have at least one collimator with at least one intermediate layer on a boundary face to a surrounding medium.

As further described above, a micro-optical system described herein has an intermediate layer on a boundary face to a surrounding medium.

For the sake of clarity of illustration, reference is made to a light-exit face. This term also relates to light-entry faces because the optical systems presented here are reciprocal.

It will be appreciated to those skilled in the art having the benefit of this disclosure that this invention is believed to provide optical rotary joints and micro-optical systems, such as collimators, used for multi-channel transmission of optical signals. Further modifications and alternative embodiments of various aspects of the invention will be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as the presently preferred embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

The invention claimed is:
1. An optical rotary joint comprising as optical constituent parts:
a first collimator arrangement for coupling-on first light-waveguides;
a second collimator arrangement for coupling-on second light-waveguides, which is supported to be rotatable relative to the first collimator arrangement about a rotation axis; and a derotating optical element which is located in a light path between the first collimator arrangement and the second collimator arrangement;

wherein an inner space of the optical rotary joint between the optical constituent parts is filled with a medium;

wherein at least one of the optical constituent parts has an intermediate layer on a boundary face of the at least one of the optical constituent parts to the medium;

wherein the intermediate layer has a refractive index in a range between a refractive index of an optical material of the at least one optical constituent part which is distinct from the intermediate layer and a refractive index of the medium; and wherein the intermediate layer comprises a nano-structure having individual elements with dimensions and distances from each other which are smaller than $\frac{1}{10}$ of a wavelength of light to be transmitted through the optical rotary joint.

2. The optical rotary joint according to claim 1, wherein the intermediate layer has a thickness larger than the wavelength of light to be transmitted through the optical rotary joint.

3. The optical rotary joint according to claim 1, wherein the nano-structure of the intermediate layer has a mean refractive index corresponding to a mean value of the refractive index of the optical material of the at least one optical constituent part and the refractive index of the medium.

4. The optical rotary joint according to claim 1, wherein the nano-structure of the intermediate layer has raised portions and recessed portions.

5. The optical rotary joint according to claim 4, wherein the recessed portions comprise 50% of a surface of the intermediate layer.

6. A collimator for at least one of optical beam guiding and beam shaping, wherein the collimator comprises an intermediate layer constituting at least one boundary face of the collimator, wherein the intermediate layer has a refractive index in a range between a refractive index of an optical material of the collimator which is distinct from the intermediate layer and a refractive index of a medium surrounding the collimator, and wherein the intermediate layer comprises a nano-structure having individual elements with dimensions and distances from each other which are smaller than $\frac{1}{10}$ of a wavelength of light to be transmitted through the collimator.

7. The collimator according to claim 6, wherein the intermediate layer has a thickness larger than the wavelength of light to be transmitted through the collimator.

8. The collimator according to claim 6, wherein the nano-structure of the intermediate layer has a mean refractive index corresponding to a mean value of the refractive index of the optical material of the collimator and the refractive index of the medium.

9. The collimator according to claim 6, wherein the nano-structure of the intermediate layer has raised portions and recessed portions.

10. The collimator according to claim 9, wherein the recessed portions comprise 50% of a surface of the intermediate layer.

11. A micro-optical system comprising an intermediate layer constituting at least one boundary face of the micro-optical system, wherein the intermediate layer has a refractive index in a range between a refractive index of an optical material of the micro-optical system which is distinct from the intermediate layer and a refractive index of a medium surrounding the micro-optical system, and wherein the intermediate layer comprises a nano-structure having individual elements with dimensions and distances from each other which are smaller than $\frac{1}{10}$ of a wavelength of light to be transmitted through the micro-optical system.

12. The micro-optical system according to claim 11, wherein the intermediate layer has a thickness larger than the wavelength of light to be transmitted through the micro-optical system.

13. The micro-optical system according to claim 11, wherein the nano-structure of the intermediate layer has a mean refractive index corresponding to a mean value of the refractive index of the optical material of the micro-optical system and the refractive index of the medium.

14. The micro-optical system according to claim 11, wherein the nano-structure of the intermediate layer has raised portions and recessed portions.

15. The micro-optical system according to claim 14, wherein the recessed portions comprise 50% of a surface of the intermediate layer.

* * * * *